United States Patent [19]

Sewell

[11] 4,161,460

[45] Jul. 17, 1979

[54] METHOD OF ENHANCING OLEOPHILIC AND HYDROPHOBIC PROPERTIES OF ABSORBENT MATERIAL

[75] Inventor: Vincent N. R. Sewell, Victoria, Canada

[73] Assignee: R. B. Cybernetris (1970) Ltd., Canada

[21] Appl. No.: 735,157

[22] Filed: Oct. 26, 1976

Related U.S. Application Data

[63] Continuation of Ser. No. 522,260, Nov. 8, 1974, abandoned.

[51] Int. Cl.$^2$ .............................................. B01J 31/02
[52] U.S. Cl. .................................... 252/426; 427/331; 428/311; 428/425; 428/485; 428/537
[58] Field of Search ................ 252/426, 427; 427/331; 428/311, 425, 485, 537; 210/DIG. 26

[56] References Cited

U.S. PATENT DOCUMENTS

| Re. 13,952 | 7/1915 | Marr | 428/485 |
|---|---|---|---|
| 89,095 | 4/1869 | Toppan | 428/537 |
| 1,445,132 | 2/1923 | Doody | 428/485 |
| 2,053,782 | 9/1936 | Reichel | 428/485 |
| 3,558,417 | 1/1971 | Salyer et al. | 428/311 |
| 3,591,524 | 7/1971 | Eriksen | 252/427 |
| 3,888,766 | 6/1975 | De Young | 210/DIG. 26 |
| 3,990,970 | 11/1976 | Porte | 210/DIG. 26 |

FOREIGN PATENT DOCUMENTS 202123 10/1955 Australia .................................. 252/426

Primary Examiner—L. Dewayne Rutledge
Assistant Examiner—John P. Sheehan
Attorney, Agent, or Firm—Craig and Antonelli

[57] ABSTRACT

A process for rendering porous materials oleophilic and hydrophobic so as to improve their ability to immobilize oil comprising coating the surfaces of the material with a non-volatile solid hydrocarbon or fatty acid. In one form the hydrocarbon may be molten paraffin wax. It may also be a solution of wax or fatty acid in a volatile organic solvent such as hexane.

2 Claims, No Drawings

METHOD OF ENHANCING OLEOPHILIC AND HYDROPHOBIC PROPERTIES OF ABSORBENT MATERIAL

This is a continuation, of application Ser. No. 522,260 filed Nov. 8, 1974 now abandoned.

This invention relates to a process for rendering porous or fibrous materials both oleophilic and hydrophobic.

It is well known that a prime cause of difficulty when oil is spilled on water is that the oil spreads continuously at a rate determined in a large measure by gravity, the oil viscosity, and the surface tension of the surface over which the oil is spreading (i.e., the water surface may, and usually is, contaminated to some extent and the degree and nature of this contamination will influence spreading rate, particularly as the oil layer becomes thin) and this results in the covering of very large areas with oil.

It has not proven feasible to immobilize the oil when large quantities were involved. One of the reasons being the quantity of immobilizing material required and another the lack of preferential wetting capability possessed by materials available in quantity.

It is the object of the present invention to provide a convenient, inexpensive and effective process which will confer the requisite preferential wetting capability on absorbent materials such as cellular or porous materials, which are available in quantity so that they may be more effectively employed in the immobilization of oil or other non-water-miscible liquids on water surfaces.

This preferential wetting capability is obtained by coating the internal and/or external surfaces of the absorbent (including adsorbent) material with non-volatile hydrocarbon or fatty acid, which may be liquid or solid when applied or when in use.

The present invention therefore provides a process for rendering porous materials oleophilic and hydrophobic so as to improve their ability to immobilize oil comprising coating the surfaces of the material with a non-volatile hydrocarbon or fatty acid. In another aspect, the present invention provides an oleophilic material suitable for picking up oil spills comprising an open cell polymeric foam coated with non-volatile hydrocarbon wax or fatty acid. Among fatty acids which are suitable are capric, palmitic, margaric and stearic acids.

This result may be achieved by treating at an appropriate temperature the above mentioned materials with molten paraffin wax or other wax or fatty acid for an appropriate period, then removing the excess wax or fatty acid by draining and squeezing or centrifuging of the treated material. The present invention confers on the treated material, in addition to the preferential wetting capability above mentioned, the further very desirable quality of moisture resistance in storage and leaves the treated material permanently in possession of its preferential pick-up (or wetting) capability. Of course, it would be understood that a mixture of waxes or fatty acids may be employed.

The paraffin wax or other wax at the appropriate temperature, preferably between 100° F. and 420° F., may be applied by spraying or dipping into a molten bath.

The application of paraffin wax or other wax or to the material may also be achieved by dissolving the wax or fatty acid in a suitable organic solvent or mixture of solvents and then dipping the material into the solution containing the wax or waxes or fatty acids. In this case the surplus liquid and wax may also be removed, and the foam then may be air dried, forced or otherwise.

The materials to which this invention may be applied include one or all parts of trees whether processed or not and generally referred to herein as forest products. Examples include: tree needles, leaves, chips, sawdust, groundwood, planer shavings, bark, pulpwood of all kinds and all fibrous materials derived from wood either directly by virtue of a physical process or through chemical treatment or combination thereof.

These materials also may include any part of any material which grows or can be grown in an agricultural or silvicultural sense, whether or not the material is used as grown or is processed in any way or ways, and generally referred to herein as vegetable products. Examples include: grasses, hay, mosses, (including peat) weeds, etc. These materials may also include porous organic substances such as polyurethane foam with a preponderance of open cells.

The present invention may most effectively be carried out when the material being treated has a low moisture content.

The quantity of hydrocarbon to be left in the material will normally be between ½% and 10% by weight.

However, it is preferable to leave approximately three percent by weight of hydrocarbon in the material but desirable characteristics are conferred by very much less or very much more. It will, however, be evident that very large quantities of hydrocarbon will tend to lessen the ability of the foam to soak up oil.

A preferred embodiment of the present invention comprises the application of paraffin wax or other wax or fatty acid by means of its solution in a suitable volatile organic solvent such as hexane. This method avoids the necessity for melting the solid wax.

As will be understood, it is preferred to use a solid hydrocarbon coating material rather than a liquid coating material, so that the porous substrate is left with a solid oleophilic coating after removal of the excess coating and any solvent which was employed. It is found that the solid coating protects the treated material more effectively in storage. It is found that the solid coating is less messy in handling of the product. Moreover, the liquid - solid treatment can be done at a low temperature.

Although this preferred embodiment can be applied to any of the materials mentioned, it is preferable to use the polyurethane foam. The combination of a flexible, elastomeric, largely open cell foam with a preferential wetting capability results in a high capacity product that can be used and re-used many times, thus resulting in a very favourable cost/unit of oil recovery ratio in spite of higher original cost on a weight basis.

Under certain conditions it is possible to load the oleophilic foam with water by virtue of what could be called ram effects, e.g., rain or rapidly plunging the foam into water — the "ram loading" takes place because the interfacial tension which prevents ingress of water under relatively static conditions is overridden by the momentum of the rapidly moving water.

The present invention confers on the treated materials, in addition to the preferential wetting capability above mentioned, the further very desirable quality of moisture resistance in storage and in addition leaves the treated material permanently able to act as wicking.

The rate at which oil is picked up by the oleophilic foam is related to the viscosity of the oil. Low viscosity oils are picked up rapidly and high viscosity oils are picked up slowly.

The embodiments of the invention in which an exclusive property or privilege is claimed are defined as follows:

1. A process for rendering open-cell elastomeric polyurethane foam material preferentially oleophilic in the presence of water to improve the oil absorption and the oil immobilization capacity of said foam material, comprising the steps of coating the surfaces of said foam material with a coating material consisting essentially of paraffin wax dissolved in an organic solvent, removing an excess of the dissolved wax and organic solvent by draining the excess from the foam material and by squeezing the foam material to remove excess wax solution from within said foam material and drying the resulting foam material to remove said solvent and to obtain a porous foam sorbent material impregnated with from about ½ percent to 10 percent by weight of said wax whereby the foam material obtained is suitable for picking up oil spills from water surfaces.

2. The process of claim 1, wherein said organic solvent is hexane.

* * * * *